United States Patent
Mola et al.

(10) Patent No.: US 8,636,419 B2
(45) Date of Patent: Jan. 28, 2014

(54) BEARING ASSEMBLY WITH OVERMOULDED ANNULAR BODIES OF PLASTIC MATERIAL

(75) Inventors: Roberto Mola, Turin (IT); Philippe Peroz, San Secondo di Pinerolo (IT); Francesco Gallucci, Nichelino (IT); Riccardo Restivo, Turin (IT)

(73) Assignee: Aktiebolaget SKF, Göteborg (SE)

( * ) Notice: Subject to any disclaimer, the term of this patent is extended or adjusted under 35 U.S.C. 154(b) by 692 days.

(21) Appl. No.: 12/682,384

(22) PCT Filed: Oct. 6, 2008

(86) PCT No.: PCT/EP2008/063310
§ 371 (c)(1),
(2), (4) Date: Apr. 9, 2010

(87) PCT Pub. No.: WO2009/047224
PCT Pub. Date: Apr. 16, 2009

(65) Prior Publication Data
US 2010/0247017 A1    Sep. 30, 2010

(30) Foreign Application Priority Data
Oct. 9, 2007   (EP) ...................................... 07118086

(51) Int. Cl.
*F16C 33/58*       (2006.01)
*F16C 35/063*     (2006.01)

(52) U.S. Cl.
CPC ............. *F16C 33/583* (2013.01); *F16C 35/063* (2013.01)

USPC ........... 384/492; 384/515; 384/565; 384/585; 384/615; 29/898.063

(58) Field of Classification Search
USPC ......... 384/449, 492, 513, 515, 536–537, 564, 384/585–586, 609, 615, 622, 482, 499; 29/898.066, 898.063; 474/199
See application file for complete search history.

(56) References Cited

U.S. PATENT DOCUMENTS

| | | | |
|---|---|---|---|
| 2,193,549 A * | 3/1940 | Chamberlin | 384/536 |
| 3,586,402 A | 6/1971 | Howe, Jr. | |
| 3,604,545 A * | 9/1971 | Bourgeois | 192/98 |
| 3,606,502 A * | 9/1971 | De Germond | 84/501 |
| 3,628,838 A * | 12/1971 | Camosso et al. | 384/514 |
| 3,657,781 A * | 4/1972 | Camosso | 29/898.066 |
| 3,732,606 A * | 5/1973 | de Germond | 29/898.063 |

(Continued)

FOREIGN PATENT DOCUMENTS

| | | |
|---|---|---|
| CH | 512315 A | 9/1971 |
| DE | 2316951 A | 10/1974 |

(Continued)

*Primary Examiner* — Marcus Charles
(74) *Attorney, Agent, or Firm* — Bryan Peckjian; SKF USA Inc. Patent Department

(57) ABSTRACT

A bearing assembly includes at least one rolling bearing unit having an outer race and an inner race rotatable relative to the outer race, and two annular bodies of plastic material overmoulded on the outer race and the inner race, respectively, of the bearing unit. At least one of the two annular bodies has a free cylindrical surface. One of the two bearing races forms a radially extending flange having a cylindrical end surface, circumferentially continuous or discrete, which ends flush with the free cylindrical surface of plastic material.

13 Claims, 5 Drawing Sheets

(56) References Cited

U.S. PATENT DOCUMENTS

| | | | |
|---|---|---|---|
| 4,113,328 A | | 9/1978 | Vander Meulen |
| 4,217,944 A | | 8/1980 | Pascal |
| 4,362,344 A | * | 12/1982 | Lederman ............ 384/482 |
| 4,602,875 A | * | 7/1986 | Doerr et al. ............ 384/488 |
| 4,848,938 A | * | 7/1989 | Haas et al. ............ 384/537 |
| 5,193,917 A | * | 3/1993 | Adler et al. ............ 384/517 |
| 6,142,675 A | * | 11/2000 | Brandenstein et al. ...... 384/537 |
| 6,645,415 B2 | * | 11/2003 | Takatsu ............ 264/262 |
| 6,666,583 B2 | * | 12/2003 | Nieman et al. ............ 384/537 |
| 6,860,639 B2 | * | 3/2005 | Tabuchi et al. ............ 474/199 |

FOREIGN PATENT DOCUMENTS

| | | | | |
|---|---|---|---|---|
| DE | 19918889 A1 | * | 9/2000 | ............ B66B 23/14 |
| GB | 557015 A | | 11/1943 | |
| GB | 2212566 A | | 7/1989 | |

\* cited by examiner

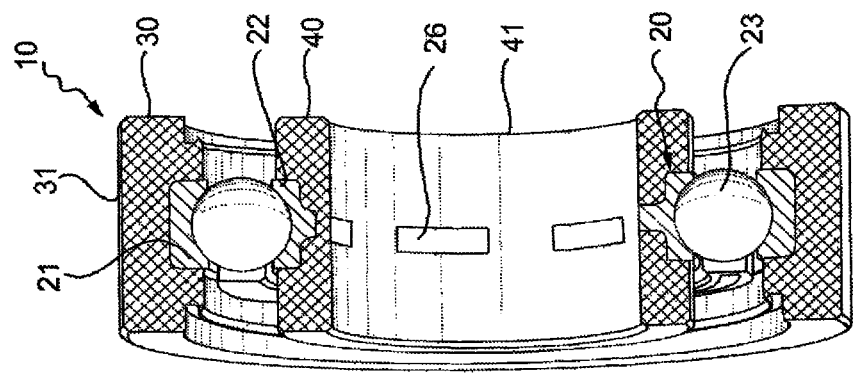
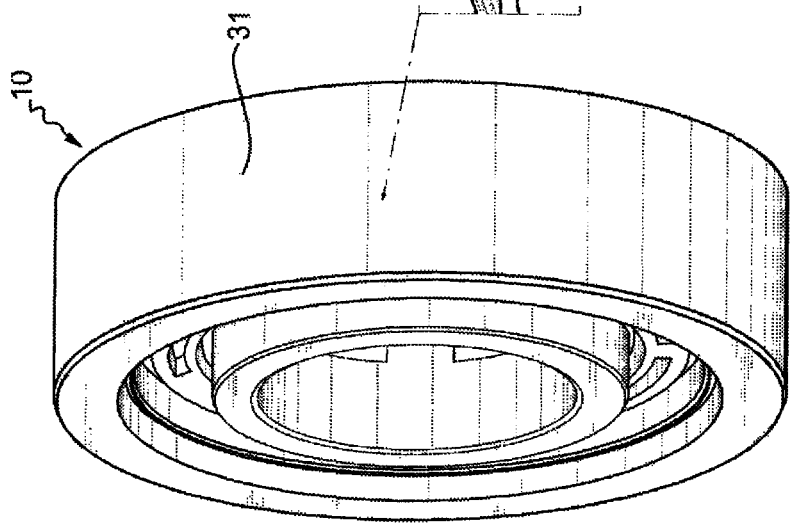

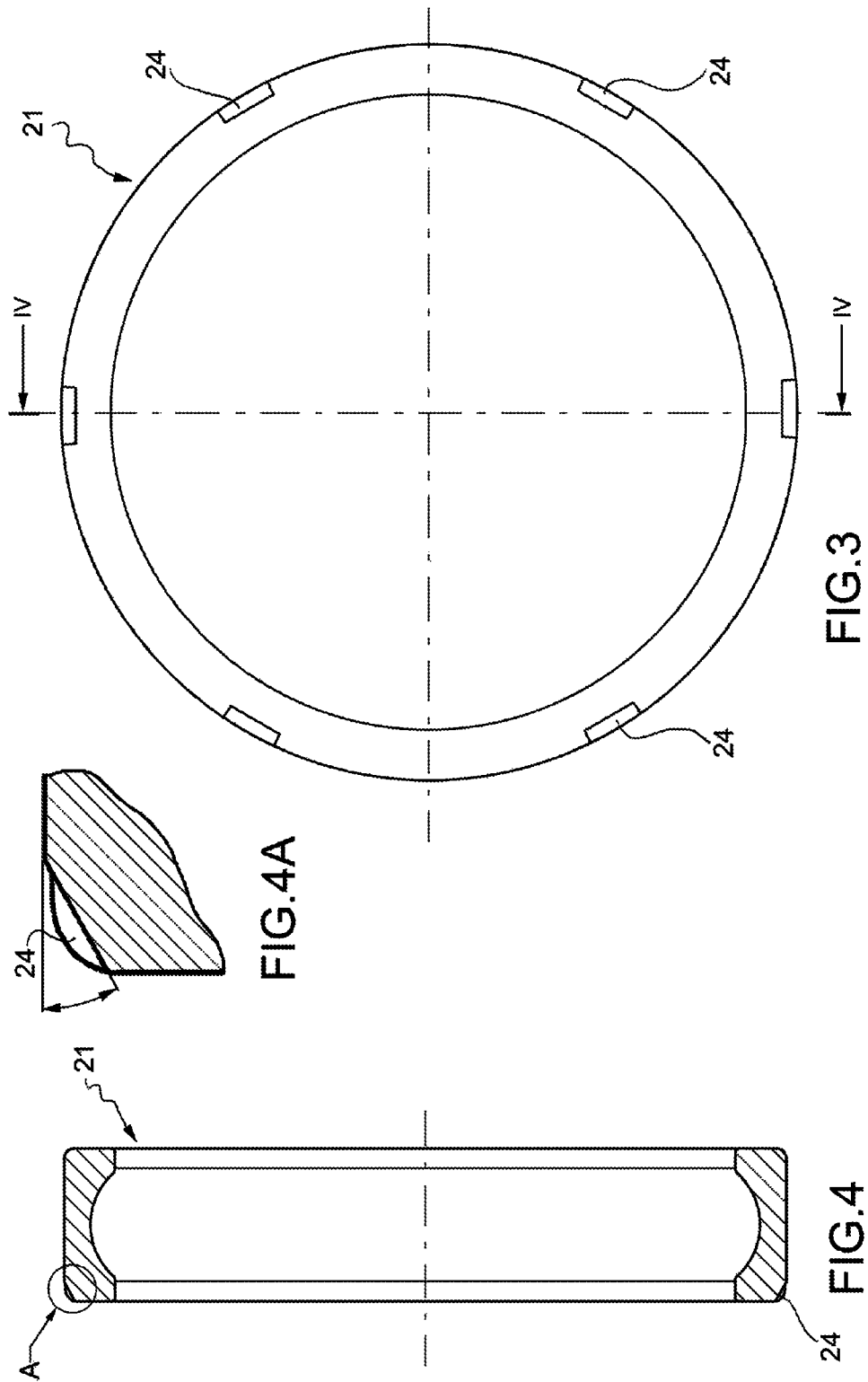

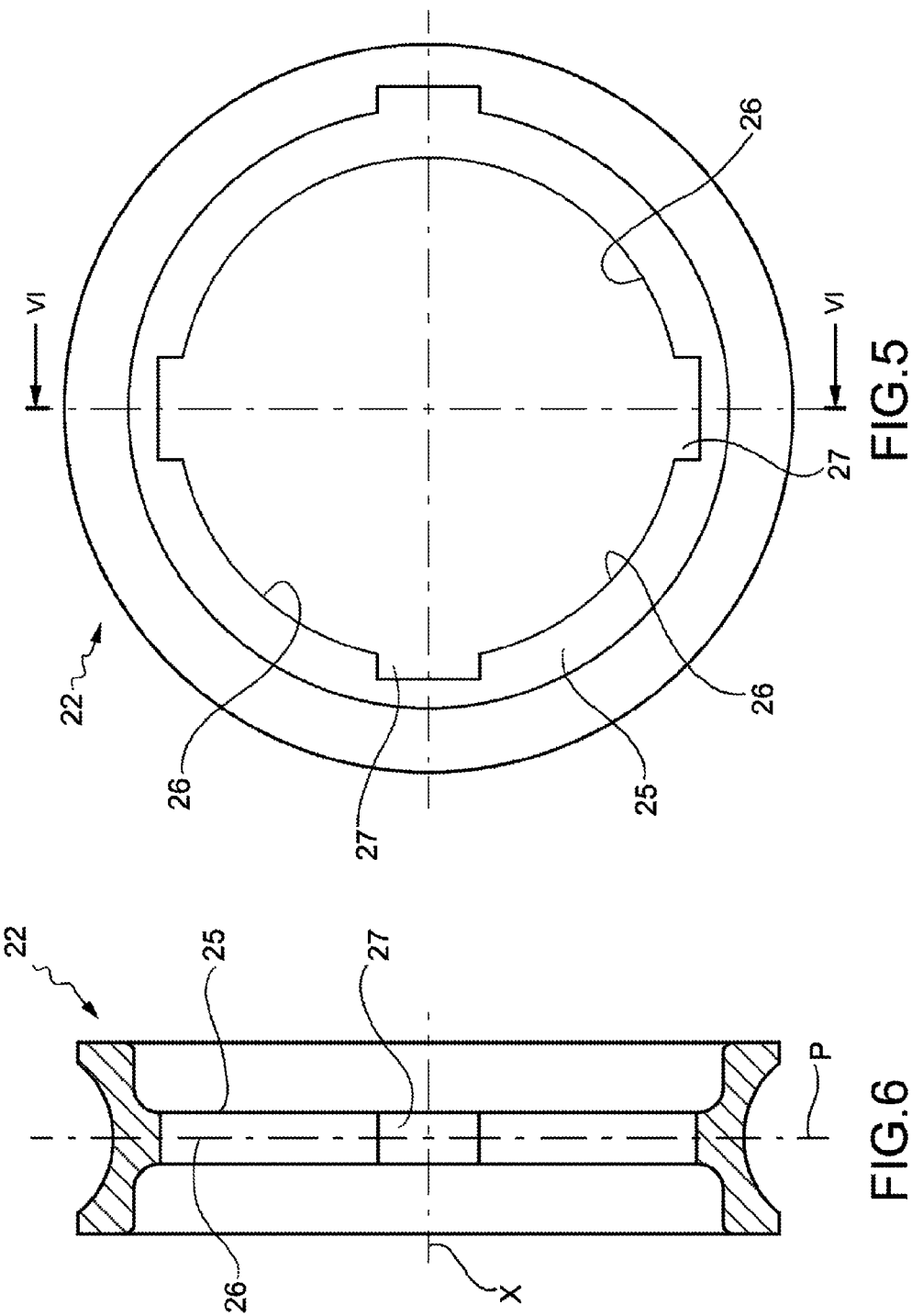

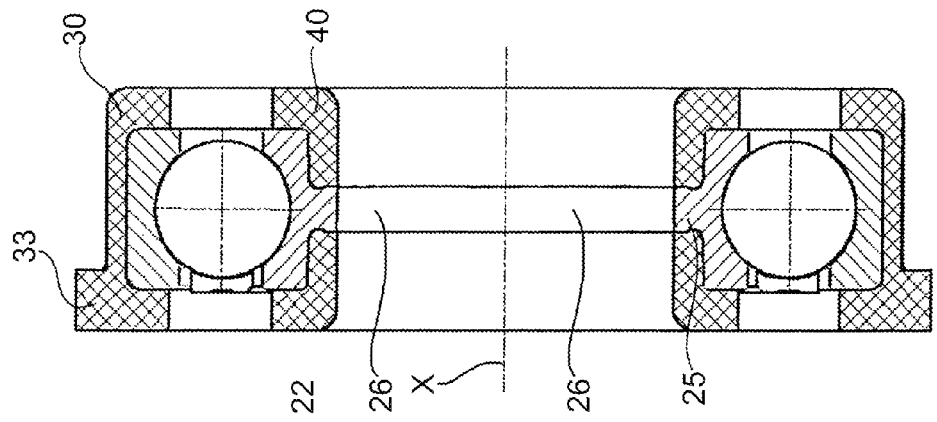
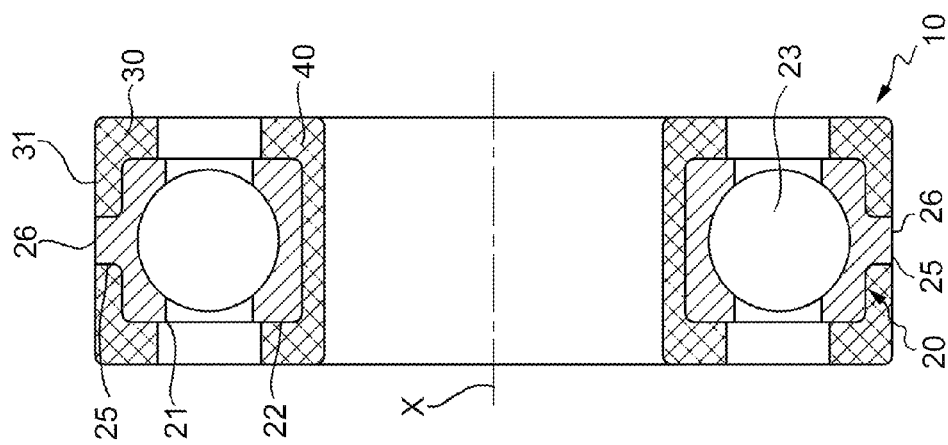
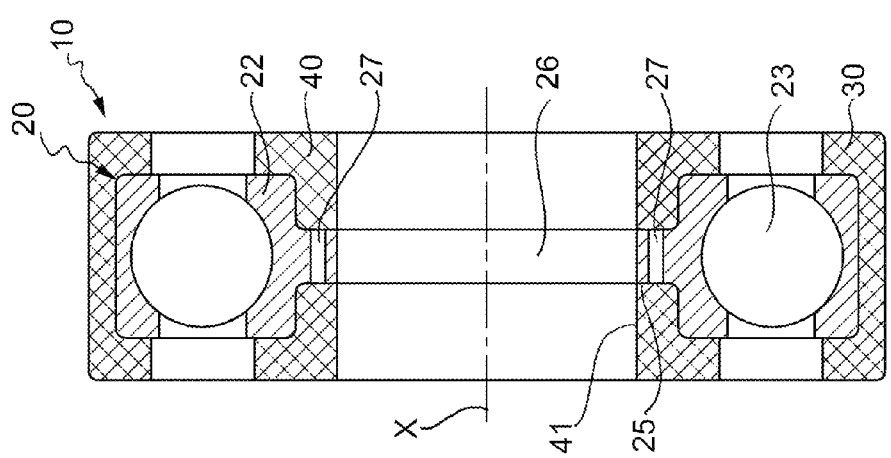

BEARING ASSEMBLY WITH OVERMOULDED ANNULAR BODIES OF PLASTIC MATERIAL

CROSS-REFERENCE TO RELATED APPLICATIONS

The present application is a 371 and claims priority from PCT application PCT/EP2008/063310, which has an international filing date of 6 Oct. 2008, and which claims priority from European Patent Application 07118086.3, filed on 9 Oct. 2007, both of which are incorporated herein by reference in their entireties.

BACKGROUND OF THE INVENTION

The invention refers to a bearing assembly with annular bodies of plastic material overmoulded on the inner and outer races of one or more bearing units. The invention further refers to a relevant bearing unit.

There are known bearing assemblies having annular elements of plastic material overmoulded on the inner and outer races of a rolling bearing. These bearing assemblies are used in various technical fields, for example for rotatably supporting a shaft in an electric motor, and particularly for application where the bearing has to be prevented from potentially damaging electric currents passing through it. Bearing assemblies of the above kind are also used for applications where it is desired to reduce the amount of steel constituting the bearing, so as to gain a weight reduction and also reduce the number of costly treatments of the bearing steel.

SUMMARY OF THE INVENTION

The object of the present invention is to achieve an excellent final result in terms of weight reduction and electrical insulation, with an ability to ensure, at the same time, high accuracy having regard to coaxiality or concentricity of the bearing raceways with respect to the central geometric axis of the axle or shaft mounted centrally in the bearing. Another object of the invention is to provide modular bearing units, usable for being overmoulded so as to attain annular bodies of plastic material of different sizes, as a function of different applications.

These and other objects and advantages, which will be better understood in the following, are accomplished, in accordance with the present invention, by a bearing assembly having the features defined in the appended claims. The invention is further directed to the relevant bearing unit.

In summary, a bearing assembly includes one or more bearing units each having an outer race and an inner race rotatable with respect to the outer race, with two annular bodies of plastic material overmoulded on the outer and inner races, respectively. One of the two races forms a radially extending flange which ends with a cylindrical, circumferentially continuous or discreet surface. This surface metal surface ends flush with a free cylindrical surface of the annular body of plastic material overmoulded on the relevant race.

An advantage is that the drive fit of the bearing assembly on a shaft fixes accurately the axial radial position of the bearing raceways with respect to the shaft. The drive fit takes place between steel and steel, and is therefore reliable with time and not affected by temperature variations which could, on the other hand, reduce stability of the coupling of two materials having different coefficients of expansion, such as steel and plastic materials.

BRIEF DESCRIPTION OF THE SEVERAL VIEWS OF THE DRAWINGS

A few preferred, but not limiting embodiments of the invention will now be described, reference is being made to the appended drawings, in which:

FIG. 1 is an overall perspective view of a bearing assembly in accordance with a first embodiment of the invention;

FIG. 1A is an enlarged view, partially in section, of an exterior surface portion of the bearing assembly shown in FIG. 1;

FIG. 2 is an axial cross-section view of the bearing assembly, shown in FIG. 1;

FIG. 3 is a side view of the outer race of a bearing unit according to the invention;

FIG. 4 is an axial cross-sectional view taken along line IV-IV in FIG. 3; FIG. 4a is an enlarged view of a detail indicated at A in FIG. 4;

FIG. 5 is a side view of the inner race of a bearing unit according to the invention;

FIG. 6 is an axial cross-sectional view taken along line VI-VI in FIG. 5; and

FIGS. 7-12 are axial cross-sectional views of further embodiments of the invention.

DETAILED DESCRIPTION OF THE INVENTION

Figure 9:
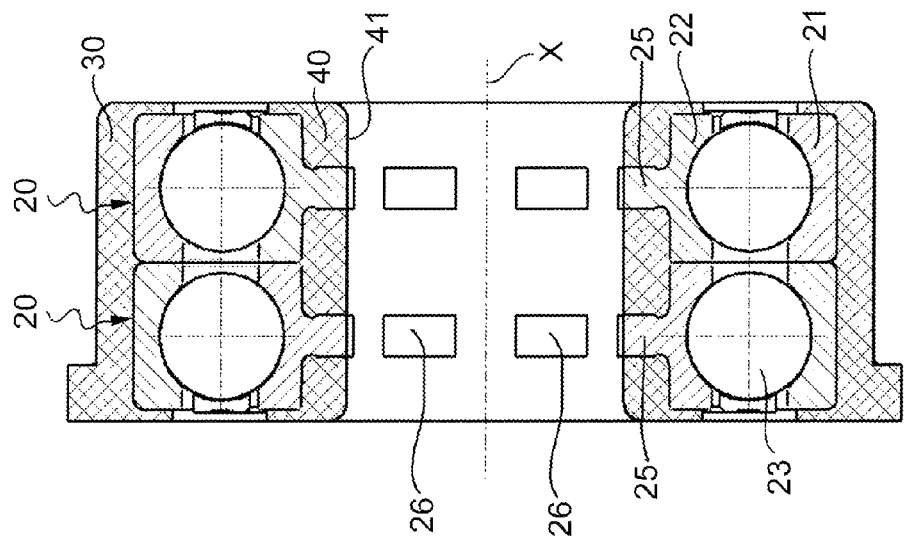

With reference initially to FIGS. 1 to 6, reference numeral 10 designates as a hole a first embodiment of a bearing assembly according to the invention. The assembly 10 comprises a bearing unit 20 having a radially outer race 21, a radially inner race 22, a set of rolling elements 23 (in this example balls) interposed between races 21 and 22, an annular body of plastic material 30 overmoulded on the outer race 21 of the bearing unit, and a radially inner annular body 40 overmoulded in the inner race 22 of the bearing unit. The plastic bodies 30, 40 are overmoulded on the bearing unit 20 when this is already assembled. Throughout the present description and the claims, terms and expressions indicating positions and orientations such as "inner", "outer", "radial", "axial" will be construed as referring to the central axis of rotation x of a bearing unit.

The outer annular body 30 has a radially outer surface 31 which, in the exemplary embodiment shown in FIG. 1A, has a set of longitudinal crests and depressions suitably sized for optimizing the drive fit of the assembly and a cylindrical housing (not shown). These crests and depressions reduce the amount of radio interference, to avoid excessive deformation of the outer body 30 owing to its forced insertion. By virtue of the drive fit, the deformation of the crests is absorbed by the depressions. The depressions may also serve as receptacles for receiving a certain amount of glue that may be applied at the interface between the outer surface of body 30 and the housing.

As shown in FIGS. 3, 4 and 4a, the outer bearing race is provided, along the circumference of its outer surface, with peripheral cavities or recesses 24. These recesses, circumferentially spaced, yield in the moulded plastic material of the annular outer body 30 a number of corresponding complementary formations which prevent relative rotation between the outer body 30 and the outer bearing race 21.

The inner race 22 of the bearing unit forms a flange 25 extending radially towards the central axis x and defining an axial cylindrical surface 26, that in this example is circumferentially discrete, suitable for coupling with a central shaft (not shown). In order to ensure a better and more uniform distribution of strain and stress, flange 25 extends in a radial plane P of axial symmetry for the bearing unit (FIG. 6). In the examples shown in FIGS. 1 to 9, the cylindrical surface 26 is formed by a plurality of segments angularly equally spaced by a corresponding number of axial passages 27 which establish a communication between the two opposite sides or radial faces of the flange 25. The passages 27 are filled with the plastic material of the radially inner annular body 40 overmoulded on the bearing inner race 22. Therefore, the passages 27 yield in the moulded plastic material of the inner annular body 40 a set of corresponding complementary formations which prevent relative rotation between the plastic body 40 and the inner race 22. The discrete cylindrical surface 26 emerges and is flush with the inner cylindrical surface 41 of the annular body 40.

As will be appreciated, the bearing assembly is made lighter as a whole by the annular bodies of plastic material 30 and 40 but, due to the flange of the inner race, and therefore the precise metal to metal coupling with the central shaft, ensures a perfect concentricity of the bearing raceways with respect to the central geometrical axis x.

Figure 8:
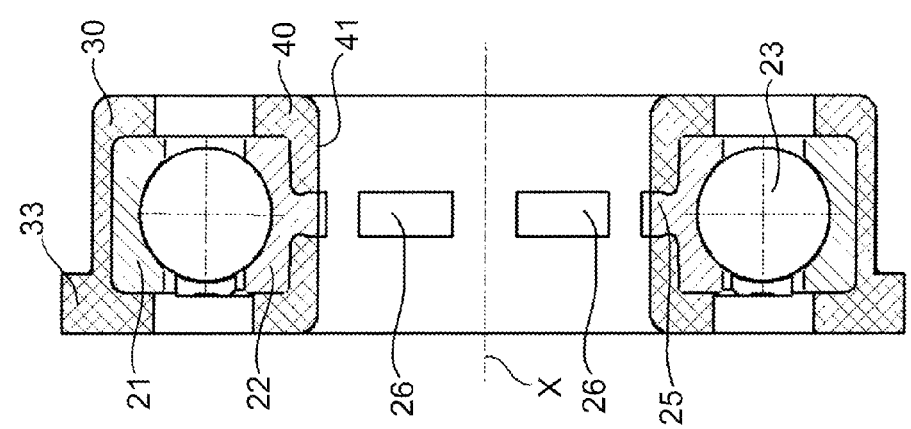
Figure 7:
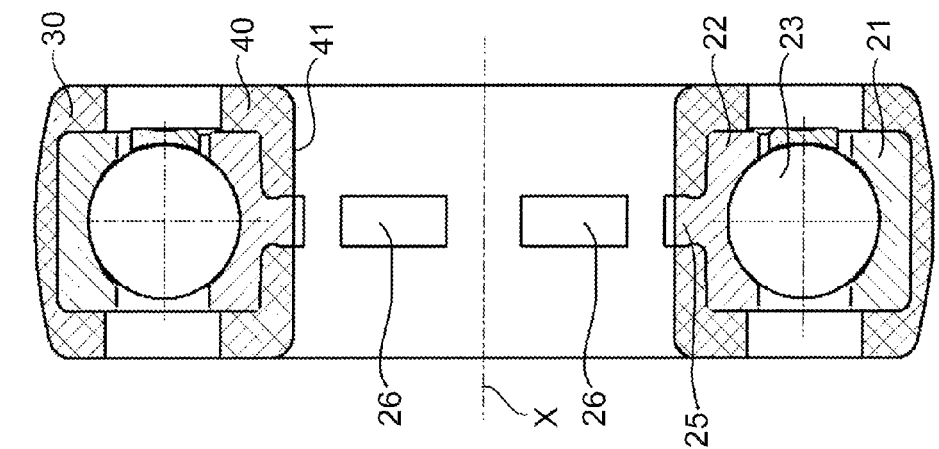

FIGS. 7, 8 and 9 show some possible variants of the invention. In FIG. 7, the outer surface of the outer plastic annular body 30 is slightly bulging instead of being cylindrical. As an alternative, this outer surface may also take different shapes, for example spherical or conical. In FIG. 8, the outer annular body 30 forms a radially outwardly protruding flange 33. In FIG. 9, two bearing units are located side to side and the annular bodies of plastic material 30 and 40 are overmoulded on the bearing units so arranged.

In the variant shown in FIG. 10, the passages 27 for the plastic material are formed by windows extending through the flange axially from one side to the other. The radially inner cylindrical surface 26 of the flange 25 is in this case circumferentially continuous. Surface 26 is substantially flush with the inner cylindrical surface 41 of the annular body 40.

In the variant of FIG. 11, the radially protruding flange 25 is formed by the outer race bearing 21. In this example, the cylindrical surface 26, which may be circumferentially continuous or discrete, according to requirements, emerges on the outer cylindrical surface of the assembly, so as to be forcefully fitted in a cylindrical housing (not shown).

According to a simplified, yet less preferred embodiment, shown in FIG. 12, the bearing race 22 forming the flange 25 lacks axial passages of the kind of those designated 27 in the previously described embodiments of the invention.

The invention is not intended to be limited to the embodiments described and illustrated herein, which should be considered as examples of implementing the assembly and bearing unit of the invention. Rather, the invention may be modified with regard to the shape and arrangement of parts, number of components, construction and functional details, as will be apparent to those skilled in the art. For example, the flange 25 will have of course an axial dimension less than that of the relevant race 22. However, the width of the flange may vary according to requirements. Finally, the bearing unit may be equipped, on one or either side, with sealing devices for lubricant grease.

The invention claimed is:

1. A bearing assembly comprising:
   at least one rolling bearing unit having an outer race and an inner race rotatable relative to the outer race;
   two annular bodies of plastic material each overmoulded on a separate one of the outer race and the inner race, at least one of the two annular bodies having a substantially free cylindrical surface;
   wherein one of the two races includes a radially extending flange having a cylindrical end surface, the end surface being substantially flush with the free cylindrical surface of a proximal one of the two plastic material annular bodies, and wherein
   the bearing unit has a central axis and the flange extends radially towards the central axis and defines an axial cylindrical surface, the cylindrical surface being circumferentially discrete and configured to be force fitted on a central shaft.

2. The bearing assembly according to claim 1, wherein the flange has to opposite sides and at least one axial passage establishing a communication between the two opposite sides, the at least one axial passage being filled with plastic material of the annular body overmoulded on the flange.

3. The bearing assembly according to claim 2, wherein the flange has a plurality of axial passages establishing a communication between the two opposite sides of the flames, each axial passage being filled with plastic material of the annular body overmoulded on the flange.

4. The bearing assembly according to claim 3, wherein the flange end surface is a circumferentially discrete surface interrupted by the axial passages.

5. The bearing assembly according to claim 1, wherein the cylindrical surface of the flange is continuous and has a plurality of discrete surface sections.

6. The bearing assembly according to claim 1, wherein the flange is configured to couple with one of the central shaft and an outer housing.

7. A rolling bearing unit comprising:
   an outer race; and
   an inner race rotatable relative to the outer race;
   wherein one of the outer and inner races includes a radially extending flange having a cylindrical end surface, and wherein
   the bearing unit has a central axis and the flange extends radially towards the central axis and defines an axial cylindrical surface, the cylindrical surface being circumferentially discrete and configured to be force fitted on a central shaft.

8. The bearing unit according to claim 7, wherein the flange extends in a radial plane of axial symmetry of the bearing unit.

9. The bearing unit according to claim 7, wherein the flange has two opposite sides and at least one axial passage establishing a communication between the two opposite sides.

10. The bearing unit according to claim 9, wherein the flange has two opposite sides and a plurality of axial passages establishing communication between the two opposite sides.

11. The bearing unit according to claim 7, wherein the flange has two opposite sides in the flange and surface is a circumferentially discrete surface interrupted by axial passages establishing communication between the two opposite sides.

12. The bearing assembly according to claim 7, wherein the cylindrical surface of the flange is continuous and has a plurality of discrete surface actions.

13. the bearing unit according to claim 7, wherein the flange is configured to couple with one of the central shaft and an outer housing.

* * * * *